US005695986A

United States Patent [19]
Wold et al.

[11] Patent Number: 5,695,986
[45] Date of Patent: Dec. 9, 1997

[54] LOW COST COMPOST BIN APPARATUS WITH AIR SUPPLY MEANS

[75] Inventors: Russell L. Wold, 2025 Westover Dr., Pleasant Hill, Calif. 94523; Kenneth R. Hepp, Hartland, Wis.

[73] Assignee: Russell L. Wold, Pleasant Hill, Calif.

[21] Appl. No.: 242,162

[22] Filed: May 13, 1994

[51] Int. Cl.⁶ ............... C12M 3/00; B65D 6/00; B65D 90/04
[52] U.S. Cl. ............ 435/290.1; 220/4.04; 220/4.05; 220/4.07; 220/4.33; 220/484; 220/908
[58] Field of Search ..................... 435/287, 313, 435/315, 299, 290.1; 422/184; 71/8–10; 220/4.04–4.11, 4.28, 4.33, 484, 908

[56] References Cited

U.S. PATENT DOCUMENTS

| | | | |
|---|---|---|---|
| 4,105,412 | 8/1978 | Petzinger | 435/313 |
| 5,052,570 | 10/1991 | Johansa | 220/4.33 |
| 5,096,080 | 3/1992 | Penny | 220/4.09 |
| 5,206,169 | 4/1993 | Bland | 435/284 |
| 5,403,740 | 4/1995 | Menefee et al. | 435/287 |
| 5,429,945 | 7/1995 | Shain | 435/313 |
| 5,432,088 | 7/1995 | Kakuk et al. | 435/316 |

FOREIGN PATENT DOCUMENTS 3019253  11/1981  Germany ............ C05F 9/02

OTHER PUBLICATIONS

"Compost with Ease", Russell Wold, 1983.

*Primary Examiner*—David R. Redding
*Attorney, Agent, or Firm*—Andrus, Sceales, Starke & Sawall

[57] ABSTRACT

A low-cost compost bin with air tubes or air panels which is easy to assemble and use. The bin is comprised of two flexible sheets which form a cylinder. Two openings are located on opposing sides of the cylinder. As material to be composted is piled in the bin, perforated air tubes are positioned at vertically spaced intervals in the composting matter. The air tubes are placed in the composting matter so that each end of the tube faces one of the openings. The air tubes provide sufficient oxygen to the composting mass and therefore, no manual turning, stirring or tumbling is required.

49 Claims, 3 Drawing Sheets

LOW COST COMPOST BIN APPARATUS WITH AIR SUPPLY MEANS

FIELD OF THE INVENTION

The present invention relates generally to composting of biodegradable waste and more specifically to a low cost, convenient composting bin which, in one embodiment, has multiple air tubes that provide an oxygen supply to the mass of composting matter without the need for turning the mass, aid in the retention of moisture in the matter, and eliminate the odor of decomposition.

BACKGROUND OF THE INVENTION

Household waste and its disposal has become one of our society's most difficult and pervasive problems. Environmentalists have thus turned to waste recycling including the composting of household and yard waste. Units of government are now requiring composting of such items in order to reduce the high cost of garbage collection and the demand for land fill sites and other garbage disposal facilities. In addition, the compost produced by composting can be used as fertilizer for yards and gardens.

Composting is a biochemical process in which organic substances are reduced from large volumes of decomposable materials to smaller volumes of materials via oxidation reactions. The remaining small volume material continues to decompose slowly. Aerobic bacteria facilitate the breakdown of the cellulose present in grass clippings, kitchen waste, dried leaves and the like. A benefit of adding compost to soil is that the nutrients in the compost are slowly released into the soil to become available for use by plants. Other advantages of adding compost to soil are improved tilth (workability), increased moisture holding capacity of all soil types, and increased rate of rainfall absorption that reduces water runoff and subsequent flood damage.

The two primary elements required for successful composting are a proper mount of moisture and a proper amount of oxygen in the organic mass to be decomposed. Too much water will inhibit the bacteria from effectively breaking down the cellulose. But, if too little moisture is available, the heat of the oxidation reactions will cause the waste mixture to dry out instead of composting properly.

Composting also needs sufficient oxygen for the aerobic bacteria to carry out the break-down of the cellulose necessary for decomposition. With insufficient oxygen, composting is difficult or impossible and the organic mass may become a source of noxious odors.

Not only are water and oxygen important to the composting reaction, but the plant material and trash used in this recycling process is also significant. High-cellulose, low-nitrogen materials, such as dead plants, dried leaves, prunings from shrubs, dead grass and sawdust, comprise most of the bulk of the composting material. High-nitrogen materials such as green grass clippings, legumes, manure, kitchen garbage, are also used in addition to low-nitrogen materials in composting. A balance of low-nitrogen to high-nitrogen materials will result in a complete degradation of the materials in addition to a creating nutrient-rich compost.

If low-nitrogen material is properly balanced with high-nitrogen material with the right amount of moisture and air, the temperature of the composting mass will reach 150° Fahrenheit. This temperature is essential because it will kill weed seeds and also sterilize the compost to eliminate unwanted bacteria. The heat will also hasten the composting process.

One composting technique previously used has involved simply piling up materials to be composted on the ground and letting them stand for long periods of time, occasionally turning or stirring the materials in order to provide oxygen to, and release heat from, core areas. This process, however, is very inefficient due to the fact that large amounts of ground space are utilized for long periods of time, much of the nutrients in the compost material are lost, disease-producing microorganisms thrive, weed seeds are not killed, and the pile is open to rodents and other pests.

Another method of composting is to pile the mass to be composted in a bin. Holes are often poked down into the mass to permit air to enter the pile. Compost bins may be made of mesh wire, snow fence, or walls that have varying mounts of open space to allow air to penetrate at least part way into the composting mass.

However, these containers may have so few holes that not enough oxygen is introduced into the composting material. It is therefore necessary to constantly turn, stir, or tumble the compost. Even with such action, the core regions of the mass may not receive the proper amounts of air and moisture to obtain efficient composting. In other systems, too many holes or perforations are present. This in turn, allows too much heat and moisture to escape, resulting in inadequate degradation of the compost material.

SUMMARY OF THE INVENTION

It is, therefore, an object of the present invention to provide a low cost, easily assembled compost bin that provides proper amounts of oxygen and retains the moisture in the composting mass, thereby avoiding the need to turn, stir, or tumble the composting mass in order to provide oxygen to the bacteria working in the composting mass.

Provision of the proper amount of air enables the compacting processes to be carried out aerobically. This avoids the odors resulting from anaerobic decomposition occurring when insufficient air is present.

Another object of this invention is to provide a compost bin that prevents the entry of flies, rodents, and other pests. This permits safe composting of garbage in urban and suburban settings.

A further advantage of this invention is to provide a compost bin that causes no odor. This is because the composting process is aerobic due to the presence of proper mount of air. Thus no anaerobic bacteria (bacteria which cause odious smells) are able to survive.

An optimum composting temperature of 125 to 150 degrees Fahrenheit is successfully maintained in the bin of the present invention. This results in an efficient and complete composting of the organic mass and sterilization of the resulting compost material.

The compost bin is easy to assemble and disassemble and requires no tools for either procedure. Four, quickly inserted slip pins or bolts are used to hold two side panels of the bin together. Because the compost bin is easy to assemble and disassemble, it can be shipped unassembled thereby reducing shipping space and costs. If the bin is not in use, it may conveniently be disassembled and stored. Furthermore, once the composting reaction is complete, there is no need to laboriously dump or shovel the compost matter from the bin. Rather, the pins holding the bin together are unfastened. The bin's side panels are released and pulled away to make the compost in the bin available.

The bin of the present invention may be mad out of a sturdy, yet flexible, recycled black polyethylene plastic having a resistance to the cracking and fading resulting from exposure to ultraviolet rays. The compost bin may be sized in accordance with the volume of material to be composted and may be sufficiently large as to handle a large mount of compost a one time.

BRIEF DESCRIPTION OF THE DRAWINGS

The invention will be further understood by reference to the accompanying drawings and following detailed description.

In the drawings.

DETAILED DESCRIPTION OF THE INVENTION

Figures 1, 2:
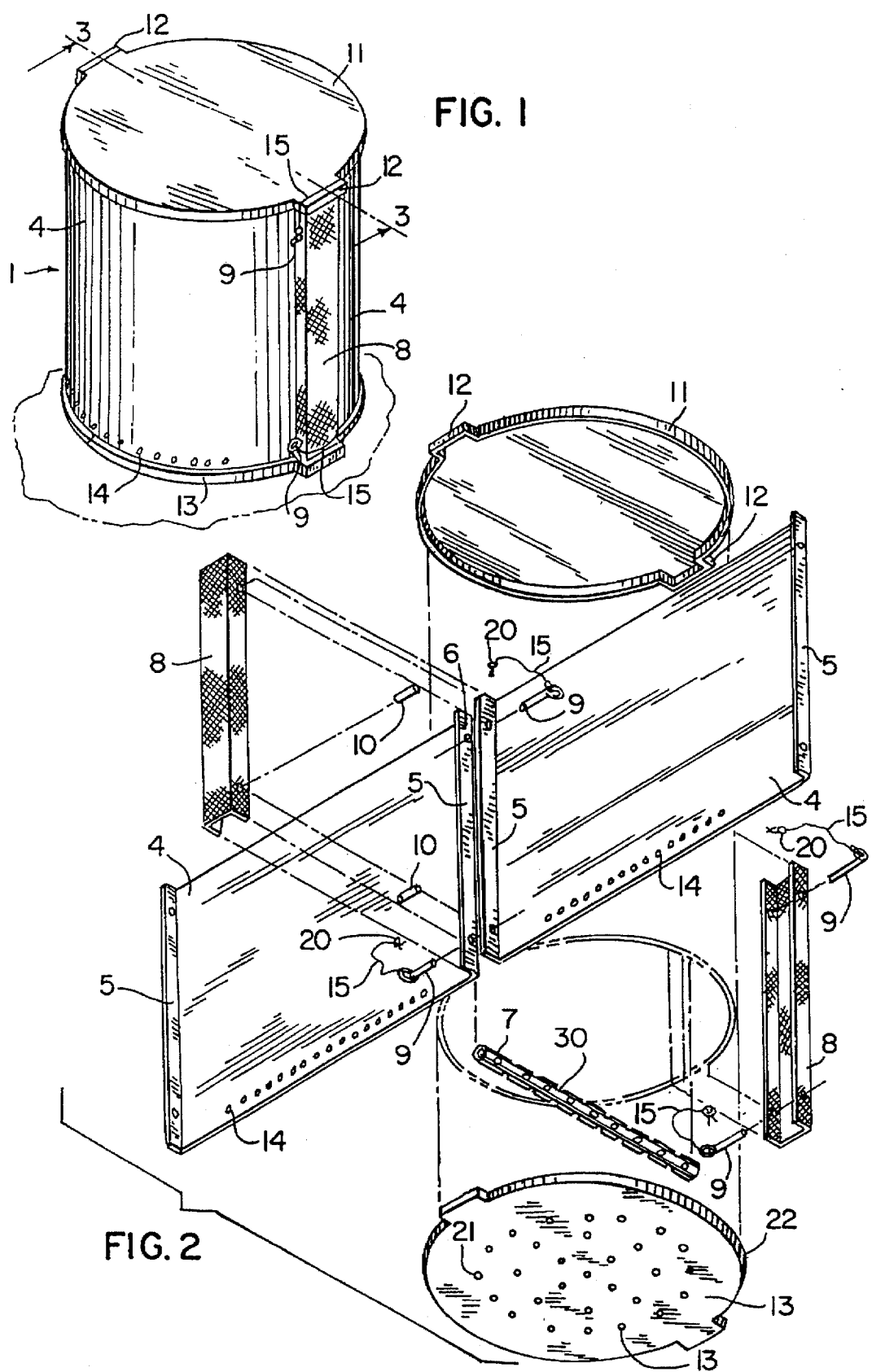
FIG. 1 is a perspective view of a compost bin apparatus in accordance with the present invention.
FIG. 2 is an exploded view of the compost bin apparatus.

FIGS. 1 and 2 show compost bin 1 of the present invention comprising lid 11, bottom panel 13 and a wall formed of two semicircular sheet-like panels or wall members 4. Additionally, bin 1 has screen structures 8 to cover side openings 6 between wall members 4 and prevent rodents and other pests from entering the bin. Lid 11 has two lips 12 which cover side openings 6 between wall members 4.

Figure 5:
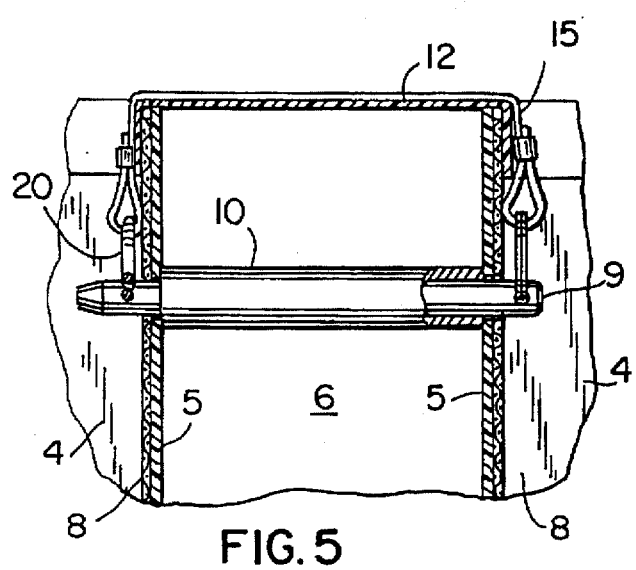
FIG. 5 is an enlarged cross sectional taken along line 5—5 of FIG. 3.

Slip pins 9 are inserted through screen structures 8 to secure screen structures 8 to the compost bin and are inserted through wall members 4 to hold the wall members in a cylindrical form. Slip pins 9 have securing cords 15, as shown in FIG. 5. The cords associated with slip pins 9 located near the upper edge of the bin can be used to hold lid 11 over the top opening of the compost bin. Securing cords 15 have hitch pins 20 which are inserted into slip pin 9 to hold slip pins 9 to the bin. Slip pins 9 may pass through spacers 10, as detailed in FIG. 5, to establish openings 6. Bolts or the like can be substituted for slip pins 9.

Figure 3:
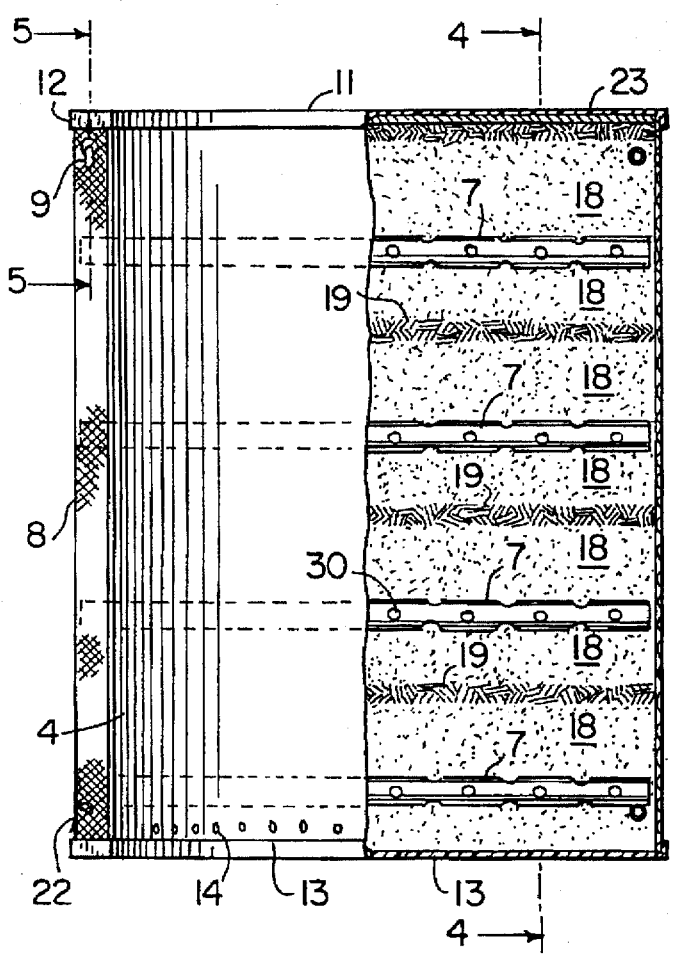
FIG. 3 is a side view with portions broken away taken along line 3—3 of FIG. 1.

A plurality of perforated air tubes, one of which is shown as air tube 7 in FIG. 2, extend horizontally through bin 1. The ends of air tubes 7 open into side openings 6, as illustrated by FIG. 3. The size of air tubes 7, and perforations 30 therein may be of an appropriate size to provide necessary amounts of oxygen to the mass of material to be composted. For example, the air tubes may be 1 to 1.5 inches in diameter. Perforations 30 may be about ½ inch in diameter.

Bottom panel 13 has a plurality of perforations 21 to allow for drainage and has a lip 22 for embracing walls 4. Walls 4 also have perforations 14 to provide drainage and air to the lower portion of the composting mass.

Assembling compost bin I is simple and easy. Sheet-like wall members 4 are bent to semicircles and arranged to form a cylinder in which edges 5 are contiguous but spaced from each other, to form two diametrically opposed side openings 6 for compost bin 1. U-shaped screen structures 8 are placed across openings 6 by fitting screen structure 8 over edges 5, passing slip pins 9 through screen structures 8, edges 5, spacers 10, and securing hitch pins 20 to Slip pins 9. This retains Screen structures 8 on walls 4 and holds bin 1 in a cylindrical form. After the walls have been assembled, they are placed on bottom panel 13 within lips 22. Lid 11 is placed onto the top opening of the composter. Lips 12 of lid 11 fit over screen structures 8 and lips 22 of bottom panel 13 cover the bottom of screen structures 8.

Cords 15 of upper slip pins 9 secure lid 11 onto the top of bin by extending over lip 12 as shown in FIG. 5. Cord 15 of lower slip pins 9 may be placed under lip 22 of bottom panel 13. Hitch pins 20 are inserted through holes in slip pins 9 to hold the cords in position.

Figure 4:
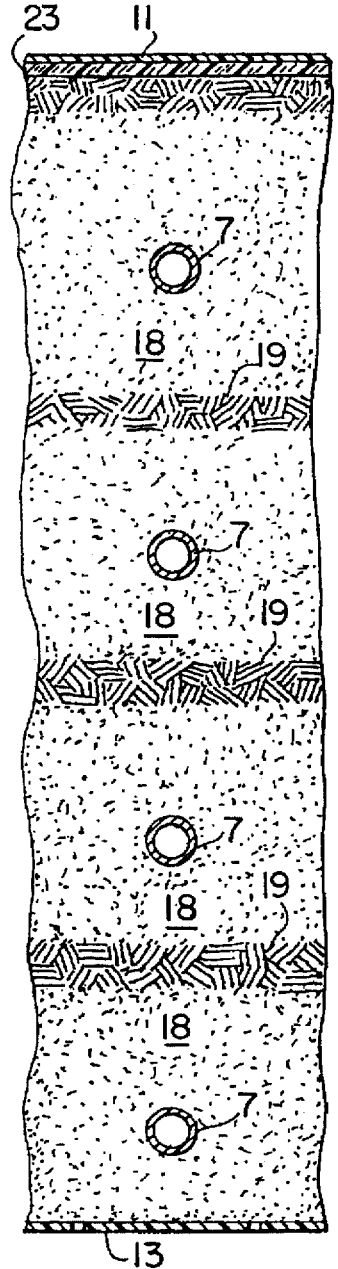
FIG. 4 is cross sectional view taken along line 4—4 of FIG. 3.

Bin 1 may also have an insulating blanket 23 which covers the composting matter within bin I, as shown in FIG. 4.

In use, bin 1 is filled with compost matter 18, which consists of a mixture of high and low nitrogen materials. See FIG. 4. This mixture is premoistened to the wetness of a wrung out sponge. The compost matter Is shoveled or forked into bin I. After about two inches of compost matter 18 have been placed in bin 1, an air tube 7 is laid across the matter so that each end of _air tube 7 communicates with an opening 6, thereby to establish an air flow path through the tube. Eight to ten inches of compost matter 18 is then piled on top of air tube 7. Lastly, a thin layer (about one inch) of topsoil 19 is put on the top of the compost matter 18.

Subsequently, the foregoing process is repeated, starting with another two inch layer of the compost matter 18. A second air pipe 7 is then horizontally placed across bin 1 with the ends in openings 6, followed by eight to ten inches of compost matter 18 and a layer of top soil. This process continues until all compost matter 18 has been placed in bin 1. Insulating blanket 23 is then laid over compost matter 18 and lid 11 is secured onto top opening 2 with securing cords 15.

After matter 18 has been completely composted and the composted material is ready to be removed, hitch pins 20 are pulled out of slip pin 9, thereby allowing securing cords to be removed from lip 12 of lid 11 and lip 22 of bottom panel 13. Lid 11 is removed. The slip pins 9 are easily pulled out of wall members 4 and screen structures 8, the screen structures 8 removed, and bin 1 unwrapped or pulled away from the material composted in the bin to leave the mass of composted material sitting on bottom 13. The composted material can be removed to a garden or the like with a tined fork.

Figure 6:
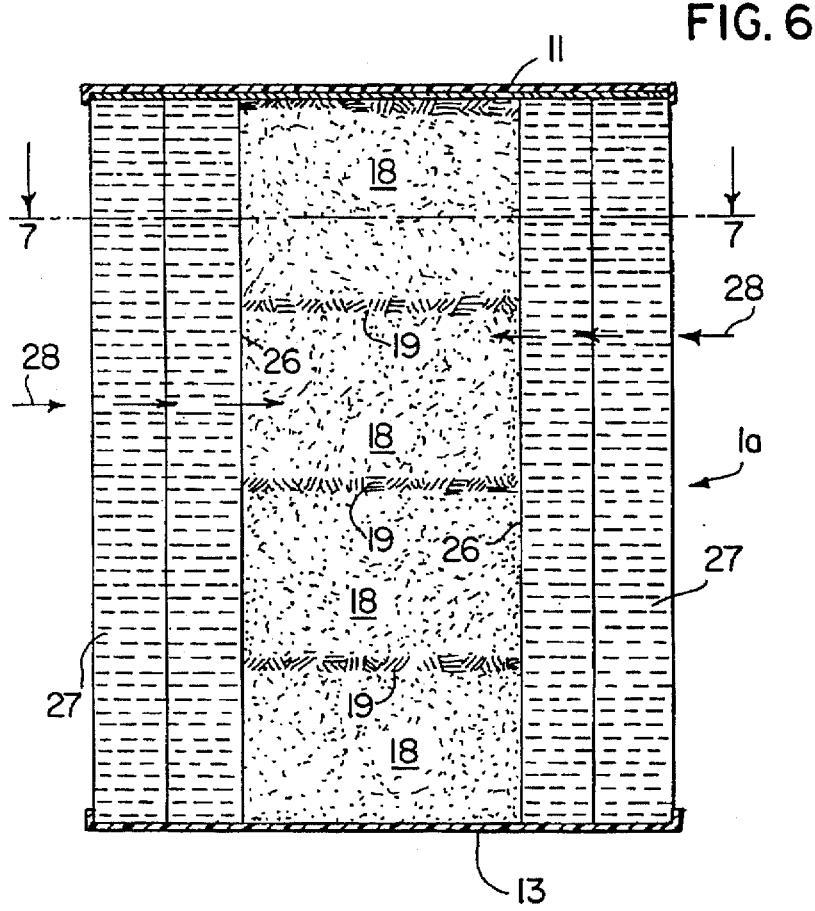
FIG. 6 is a vertical cross section view showing a modification of the compost bin of the present invention.
Figure 8:
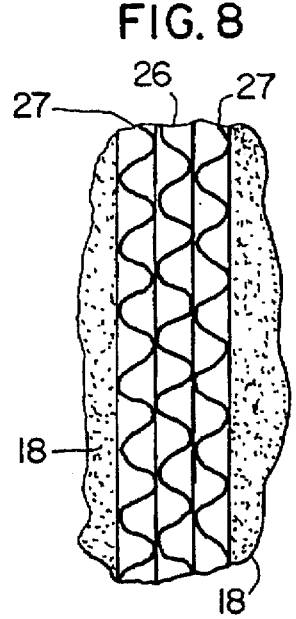
FIG. 8 is a partial view of an air supplying element of the compost bin shown in FIGS. 6 and 7 taken along line 8—8 of FIG. 7.
Figure 7:
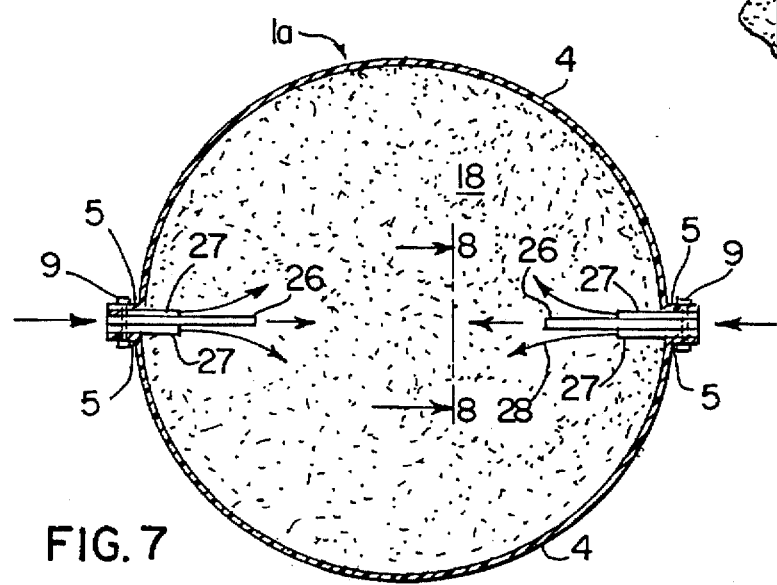
FIG. 7 is a horizontal cross sectional view taken along line 7—7 of FIG. 6.

Another embodiment of the compost bin of this invention is shown in FIGS. 6 through 8. FIG. 6 illustrates a cross sectional view through bin 1a. Bin 1a has lid 11 and a bottom panel 13 similar to bin 1 of FIGS. 1–5.

In bin 1a, aeration sheet panels 26 and 27 are substituted for air tubes 7. Two sizes of side panels may be employed: panels 26 extend radially inwardly a greater distance than panels 27. As shown most clearly in FIG. 7, one short panel 27 may be on either side of a longer panel 26. Panels 26 and 27 extend along the vertical dimension of bin 1 a from top to bottom.

FIG. 8 illustrates the composition of panels 26 and 27. As seen in that figure, the material used for panels 26 and 27 is a corrugated type structure allowing air flow in a radial direction of bin 1a. The material used for panels 26 and 27 may compromise a plastic corrugated material made and sold under the trademark "Coroplast". Both panels 26 and panels 27 are in continuous communication with outside air via side openings 6. Other air permeable material may be used for aeration sheet panels.

Assembling compost bin 1 is similar to the previous embodiment. The sheet-like wall members 4 are bent to form a cylinder with edges 5 contiguous with each other, causing the formation of two diametrically opposed openings 6. Panels 26 and 27 are placed in openings 6 in the manner best seen in FIG. 7. Slip pins 9 are passed through edges 5 and panels 26 and panels 27. This arrangement secures panels 26 and panels 27 with slip pins 9 to the bin causes them to remain upright in the bin, and holds bin 1 in a cylindrical form. If desired, screens 8 may be omitted since the corrugation of panels 26 and 27 act in the manner of a screen.

The compost matter 18 is piled inside bin 1a with alternating layers of top soil 19 in the manner described above.

The air flow to the composting matter is shown by arrows 28 in FIG. 7. The air flow 28 passes through panels 26 and panels 27 from openings 6 to the composting matter inside bin 1a.

Various modes of carrying out the invention are contemplated as being within the scope of the following claims particularly pointing out and distinctly claiming the subject matter regarded as the invention.

We claim:

1. A bin apparatus for composting material comprising:
   an upright bin suitable for receiving a mass of material to be composted, said bin having a top opening and a bottom opening; said bin having a wall extending between said top opening and bottom opening and formed of a pair of flexible, solid, sheet-like wall members, each of said sheet-like member forming a portion of said bin wall, said wall members having vertically extending edges, the edges of one wall member being contiguous to the edges of the other wall member at ends of said wall members to form two side openings in said bin wall proximate to said edges at two different locations spaced about the bin wall; joinder means coupled to the edges of said wall members for holding said wall members together to form said upright bin; and a plurality of perforated air tubes extending through the mass of material to be composted at vertically spaced intervals in the mass, the ends of said tubes being positionable in communication with said side openings in said bin for supplying air to the mass.

2. The bin apparatus of claim 1 wherein said contiguous edges of said wall members form a pair of slot-like openings communicating with said ends of said air tubes.

3. The bin apparatus of claim 1 wherein said wall members generally form a cylinder in which each of said wall members generally forms half of said bin wall.

4. The bin apparatus of claim 3 wherein said side openings are diametrically opposed to each other in said bin wall.

5. The bin apparatus of clam 1 wherein sad bin has screen structures covering said side openings allowing oxygen to enter said bin while keeping rodents, insects and other pests out of the bin.

6. The bin apparatus of claim 5 wherein each said wall edge forms a flange and wherein said screen structures form a "U" shape fitting over said flanges of contiguous wall edges so that the screen structure embraces both flanges adjacent a side opening and covers said side opening.

7. The bin apparatus of claim 6 wherein said joinder means is further defined as securing said screen structures to said bin.

8. The bin apparatus of claim 7 wherein the joinder means comprises at least one elongated member inserted through both the flanges and screen structure thereby securing the screen structure over said side openings and on the wall members.

9. The bin apparatus of clam 8 wherein said elongated member comprises a slip pin.

10. The bin apparatus of clam 8 wherein sad elongated member comprises a bolt.

11. The bin apparatus of clam 8 wherein sad joinder means contains a spacer positioned between said flanges and wherein sad elongated member is inserted through said spacer.

12. The bin apparatus of clam 1 wherein sad bin includes a removable lid that covers the top opening of the bin.

13. The bin apparatus of claim 5 wherein said bin includes a removable lid that covers the top opening of the bin and wherein said lid has downwardly extending lips for covering the upper edges of said screen structures.

14. The bin apparatus of claim 6 wherein said bin includes a removable lid that covers the top opening of the bin and wherein said joinder means comprises at least one elongated member inserted through a pair of contiguous flanges and associated screen structure, thereby securing the screen structure over a side opening and on the wall members, and wherein said elongated member has a securing cord which affixes said lid onto the top of said bin.

15. The bin apparatus of claim 1 wherein said bin contains an insulating cover positionable over the mass of material in said bin.

16. The bin apparatus of claim 1 wherein said bin has a perforated bottom panel permitting for drainage of the bin.

17. The bin apparatus of claim 1 wherein said wall members have a plurality of perforations therein to provide air and drainage to the mass of material.

18. The bin apparatus of claim 12 wherein said wall members and said lid are constructed of black, recycled, polyethylene plastic.

19. The bin apparatus of claim 16 wherein said bottom panel is constructed of black, recycled, polyethylene plastic.

20. The bin apparatus of claim 1 wherein said perforated air tubes are constructed of recycled, polyethylene plastic.

21. The bin apparatus of claim 1 wherein each of the perforated tubes has an annular wall with adjacent diametrically opposed pairs of holes extending through the wall at spaced intervals along its length, adjacent pairs of holes lying at 90 degree angles to each other.

22. The bin apparatus of claim 14 wherein said securing cord has a hitch pin attached to one end of said securing cord, said elongated member being attached to the other end of said securing cord, said hitch pin fitting through an opening in said elongated member when said elongated member is inserted through said contiguous flanges and screen structure, and said securing cord being placeable over said lid, thereby securing said lid onto said bin.

23. A bin apparatus for composting material comprising:
   an upright bin suitable for receiving a mass of material to be composted, said bin having a wall extending between a top opening and a bottom opening and formed of a pair of flexible, sheet-like wall members, each of said sheet-like member generally forming a portion of said bin wall, said wall members having vertically extending edges, the edges of one wall member being contiguous to the edges of the other wall member at ends of said wall members to form two side openings in said wall proximate to said edges at two different locations spaced about the bin wall; joinder means coupled to the edges of said wall members for holding said wall members together to form said upright bin; and a plurality of air panels extending inwardly from said side openings into the mass of material to be composted for supplying air to the mass.

24. The bin apparatus of claim 23 wherein said contiguous edges of said wall members form a pair of slot-like openings communicating with said air panels.

25. The bin apparatus of claim 23 wherein said wall members generally form a cylinder in which each of said wall members generally forms half of said bin wall.

26. The bin apparatus of claim 25 wherein said side openings are diametrically opposed to each other in said bin wall.

27. The bin apparatus of claim 23 wherein said bin has screen structures covering said side openings allowing oxygen to enter said bin yet keeping rodents, insects and other pests from entering the bin.

28. The bin apparatus of claim 27 wherein each said wall edge forms a flange and wherein said screen structures form a "U" shape fitting over said flanges of contiguous wall edges so that the screen structure embraces both flanges adjacent a side opening and covers said side opening.

29. The bin apparatus of claim 28 wherein said joinder means is further defined as securing said air panels to said bin.

30. The bin apparatus of clam 29 wherein the joinder means comprises at least one elongated member inserted through both the flanges and air panels.

31. The bin apparatus of clam 30 wherein said elongated member comprises a slip pin.

32. The bin apparatus of claim 30 wherein said elongated member comprises a bolt.

33. The bin apparatus of claim 30 wherein said joinder means contains a spacer positioned between said flanges and wherein said elongated member is inserted through said spacer.

34. The bin apparatus of claim 23 wherein said bin includes a removable lid that covers the top opening of the bin.

35. The bin apparatus of claim 34 wherein said bin includes a removable lid that covers a top opening of the bin and wherein said lid has downwardly extending lips for embracing said wall members.

36. The bin apparatus according to claim 34 wherein said joinder means comprises at least one elongated member inserted through both contiguous edges of said wall members and an air panel and wherein said elongated member has a securing card which affixes said lid on to the top of said bin.

37. The bin apparatus of claim 23 wherein said bin contains an insulating cover positionable over the composting material in said bin.

38. The bin apparatus of claim 23 wherein said bin has a perforated bottom panel allowing for drainage.

39. The bin apparatus of claim 23 wherein said wall members have a plurality of perforations therein to provide air and drainage to the mass of material.

40. The bin apparatus of claim 34 wherein said wall members and said lid are constructed of black, recycled, polyethylene plastic.

41. The bin apparatus of claim 38 wherein said bottom panel is constructed of black, recycled, polyethylene plastic.

42. The bin apparatus of claim 23 wherein said plurality of air panels extend between the top opening and bottom opening of said bin, said air panels lying generally parallel to each other.

43. The bin apparatus of claim 23 wherein said plurality of air panels are divided into at least two groups of air panels, one group of air panels extending inwardly from each of said side openings in said wall.

44. The bin apparatus of claim 23 the air panels extending from at least one of said side openings includes a central panel having side panels on either side thereof, said central panel extending into the mass of material to be composted a greater extent than said side panels.

45. The bin apparatus of claim 23 wherein said air panels are constructed of a corrugated material having a plurality of passages extending inwardly from said side openings.

46. The bin apparatus of claim 45 wherein the passages in said corrugated material extend normal to said side openings.

47. The bin apparatus of claim 23 wherein said air panels are constructed of an air permeable material.

48. The bin apparatus of claim 36 wherein said securing cord has a hitch pin attached to one end of said securing cord, said elongated member being attached to the other end of said securing cord, wherein said hitch pin fits through an opening in said elongated member when said elongated member is inserted through said contiguous edges of said wall members and an air panel and said securing cord being placeable over a lid for said bin, thereby securing said lid onto said bin.

49. The bin apparatus according to claim 23 wherein said air panels have a plurality of passages extending inwardly from said side openings.

* * * * *